United States Patent
Luchini et al.

(10) Patent No.: US 8,104,568 B2
(45) Date of Patent: Jan. 31, 2012

(54) SEISMIC GUN ASSEMBLY FOR SHOOTING INTO A BORE HOLE

(75) Inventors: Chris Luchini, Los Alamos, NM (US); Richard Morley, Los Alamos, NM (US)

(73) Assignee: Chris Luchini, Los Alamos, NM (US)

( * ) Notice: Subject to any disclaimer, the term of this patent is extended or adjusted under 35 U.S.C. 154(b) by 242 days.

(21) Appl. No.: 12/558,704

(22) Filed: Sep. 14, 2009

(65) Prior Publication Data
US 2011/0079460 A1   Apr. 7, 2011

(51) Int. Cl.
*G01V 1/40* (2006.01)
(52) U.S. Cl. ........ 181/106; 181/113; 181/116; 181/117; 89/198
(58) Field of Classification Search .................. 181/106, 181/113, 116, 117, 223; 89/198
See application file for complete search history.

(56) References Cited

U.S. PATENT DOCUMENTS

| | | | |
|---|---|---|---|
| 1,585,664 A | 5/1926 | Gilman | |
| 2,544,573 A | 3/1951 | Vincent | |
| 2,993,544 A | 7/1961 | Carlson | |
| 3,215,223 A | 11/1965 | Kirby et al. | |
| 3,232,168 A | 2/1966 | Mangeng et al. | |
| 3,695,715 A | 10/1972 | Godfrey | |
| 4,030,557 A | 6/1977 | Alvis et al. | |
| 4,059,820 A * | 11/1977 | Turpening | 367/140 |
| 4,223,759 A | 9/1980 | Martin | |
| 4,324,310 A | 4/1982 | Wener et al. | |
| 4,354,572 A | 10/1982 | Martin | |
| 4,691,803 A | 9/1987 | Martin | |
| 4,739,857 A * | 4/1988 | Airhart | 181/113 |
| 4,867,266 A * | 9/1989 | Martin | 181/106 |
| 4,991,685 A * | 2/1991 | Airhart | 181/106 |
| 5,278,359 A * | 1/1994 | Miller et al. | 181/106 |
| 5,416,282 A * | 5/1995 | King | 181/113 |
| 5,996,709 A | 12/1999 | Norris | |
| 2003/0205428 A1 * | 11/2003 | Chang | 181/108 |
| 2004/0069138 A1 * | 4/2004 | Jebsen et al. | 89/198 |

* cited by examiner

Primary Examiner — Forrest M Phillips
(74) Attorney, Agent, or Firm — David O. Simmons (57) ABSTRACT

A seismic gun assembly comprising a barrel and guide tube assembly for delivering a projectile to the bottom of a bore hole with a non-line-of-sight section. The guide tube being either a large diameter guide tube or a tight fitted guide tube. The large diameter guide tube allowing the projectile to perform shallow angle bounces to reach the bottom of a non-line-of-sight bore hole. The tight fitted guide tube allows the projectile to ride the inner wall of the guide tube to reach the bottom of a non-line-of-sight bore hole. The projectile comprises an outer jacket and a frangible core. The seismic gun barrel assembly additionally comprises a fluid exclusion puck for preventing fluids from entering the guide tube, a suppressing collar for suppressing seismic noise, and a method for modulating recoil.

18 Claims, 10 Drawing Sheets

SEISMIC GUN ASSEMBLY FOR SHOOTING INTO A BORE HOLE

BACKGROUND OF THE INVENTION

A. Field of the Invention

The present invention relates generally to a seismic gun assembly having a guide tube for delivering a projectile through a bore hole to interact with geologic formations. Additionally, the present invention relates to an assembly for suppressing noise when introducing a projectile through a guide tube, a fluid preventative seal for preventing fluids from entering the guide tube, and a method and apparatus for modulating the recoil force when the seismic gun is fired.

B. Background of the Invention

Seismic apparatuses and seismic guns are presently used as a tool for acquisition of data on geographical topology. Geographical survey specialists use seismic guns that launch projectiles into bore holes to create seismic waves which return data on underground topology. Presently, these seismic guns do not produce accurate data because of their inability to launch projectiles to the bottom of non-line-of-sight bore holes.

Another difficulty with obtaining geological topology data from the use of seismic guns is the collection of natural water in reservoirs. The energy of pressure waves caused by the impact of the projectile at the bottom of the bore hole depends upon the momentum the projectile transfers when it impacts the ground. Stronger pressure waves provide more reliable data. When a projectile passes through a fluid, the momentum of the projectile is reduced before reaching the end of the bore hole and thus the magnitude of the impact at the end of the bore hole is reduced. Hence, the relevant pressure waves are weaker and the received data is less accurate.

Currently, seismic exploration of geophysical material begins with use of a rotary drilling rig, which drills intermediate depth holes in the ground for the insertion of a seismic gun barrel. It is well known in the relevant art that over long distances a rotary drill will deviate from a straight-line course and produce a vertical bore hole that does not have a linear line-of-sight from the top to the bottom of the bore hole. Present seismic guns fail to account for bore holes that are non-line-of-sight. As a consequence, the projectiles of current seismic guns typically contact the sides of the bore hole before reaching the bottom. This causes two problems, first the projectile loses momentum before reaching the bottom of the bore hole; and second, the contact with the side of the bore hole causes extraneous pressure waves which may interfere with sensors that detect reflected pressure waves.

Moreover, launching of projectiles via chemical propellants or compressed gas may cause loud noises to be emitted in the surveyed area. Noise pollution of this type has two distinct problems. First, the noise may create additional pressure waves which will interfere with the sensors. Second, the noise may be dangerous to workers and a nuisance to people nearby.

Lastly, there exists a problem relating to the recoil of seismic guns when the projectile is launched from the surface into the bore hole. The force used to launch a projectile at a preferred velocity will be of such a magnitude that it will cause the seismic gun to recoil strongly in the opposite direction in which the projectile is launched. The recoil is problematic because it can cause vibrations in the ground that may interfere with the sensor.

U.S. Pat. No. 4,867,266 to Martin teaches a sequential fired seismic energy apparatus for slanted bore holes. Martin teaches that either a vertical bore hole or a slanted bore hole at a 45° angle is first created. After the bore hole is created, an elongated tube that is made of stiff material, such as plastic, is placed into the bore hole when sequential fired seismic energy is desired.

Other methods and apparatuses have been devised which attempt to prevent fluids or water from entering the barrel of a seismic gun. For example, U.S. Pat. No. 4,324,310 to Wener et al. teaches a seismic gun barrel assembly that holds one or more explosive energy sources. Additionally, the barrel comprises seals, such as "O" rings, to provide a water-tight seal to exclude water.

Another method and apparatus that has been devised for the exploration of geographical areas is disclosed in U.S. Pat. No. 5,996,709 to Norris. Norris teaches a system and a portable drill for drilling a shot hole in mixed geologic conditions. Additionally, the apparatus of Norris teaches a shot barrel engaged with the drill to create a shot hole path for directing explosive projectiles against hard rock.

Neither the system nor the methods disclosed in the Martin, Wener and Norris patents remedy the deficiencies of present seismic guns, particularly to non-line-of-sight bore holes, sound suppression and modulating recoil. The water prevention system of Wiener is likewise deficient and fails to cure the deficiencies of the present seismic guns.

Thus, the prior art does not recognize or cure the above deficiencies of present seismic guns. The present invention provides a solution to prior deficiencies associated with curved bore holes, sound suppression, water prevention, and modulating recoil of a seismic gun.

SUMMARY OF THE INVENTION

The present invention comprises an assembly that provides a guide tube that is conjoined with the muzzle end of a seismic gun barrel for firing a projectile into a non-line-sight bore hole. The guide tube size may range between that of a large diameter guide tube or a tight fitted guide tube where the size is relative to the diameter of the projectile. The term "tube" is intended to mean a conduit, but is not restricted to structures with circular cross-sections or constant cross-sections.

At the bottom of the guide tube is a fluid exclusion device or puck. The puck prevents water from entering the guide tube. The puck is inserted into the guide tube and forced to the terminal end of the guide tube to create a fluid exclusion seal.

Additionally, the present invention provides a noise suppression assembly. The noise suppression assembly includes a collar which encloses the junction between a gun barrel and a guide tube. The barrel is initially in a rest position, but moves upward to a recoil position when the gun is fired. The barrel includes a plurality of slots that are covered in the rest position, but are opened in the recoil position, allowing the barrel of the gun to vent into the collar. The collar may contain a liquid such as water, to aid in cooling the propellant gases, and may be connected to a vacuum reservoir for improved ventilation.

The noise suppression system can be used separately from or in conjunction with a braking system. When the gun is fired, the gun itself is driven upward into a recoil position by the force of the firing. The braking system may create a force opposite that of the projectile leaving the seismic gun and may include a dampening apparatus which dampens the return to the rest position from the recoil position.

Another aspect of the present invention is an improved seismic gun projectile. The improved projectile is constructed to lessen the penetration of the rock at the bottom of the guide tube. Instead the projectile is designed to inelastically collide, for example by breaking down or liquefying upon contact with the rock, thereby transferring more of its momentum to the ground. Thus, the projectile preferably consists of a jacket enclosing a frangible material. The precise material and design of the projectile will depend in part, on the geology of the ground being fired at.

DETAILED DESCRIPTION OF THE INVENTION

Figure 1:
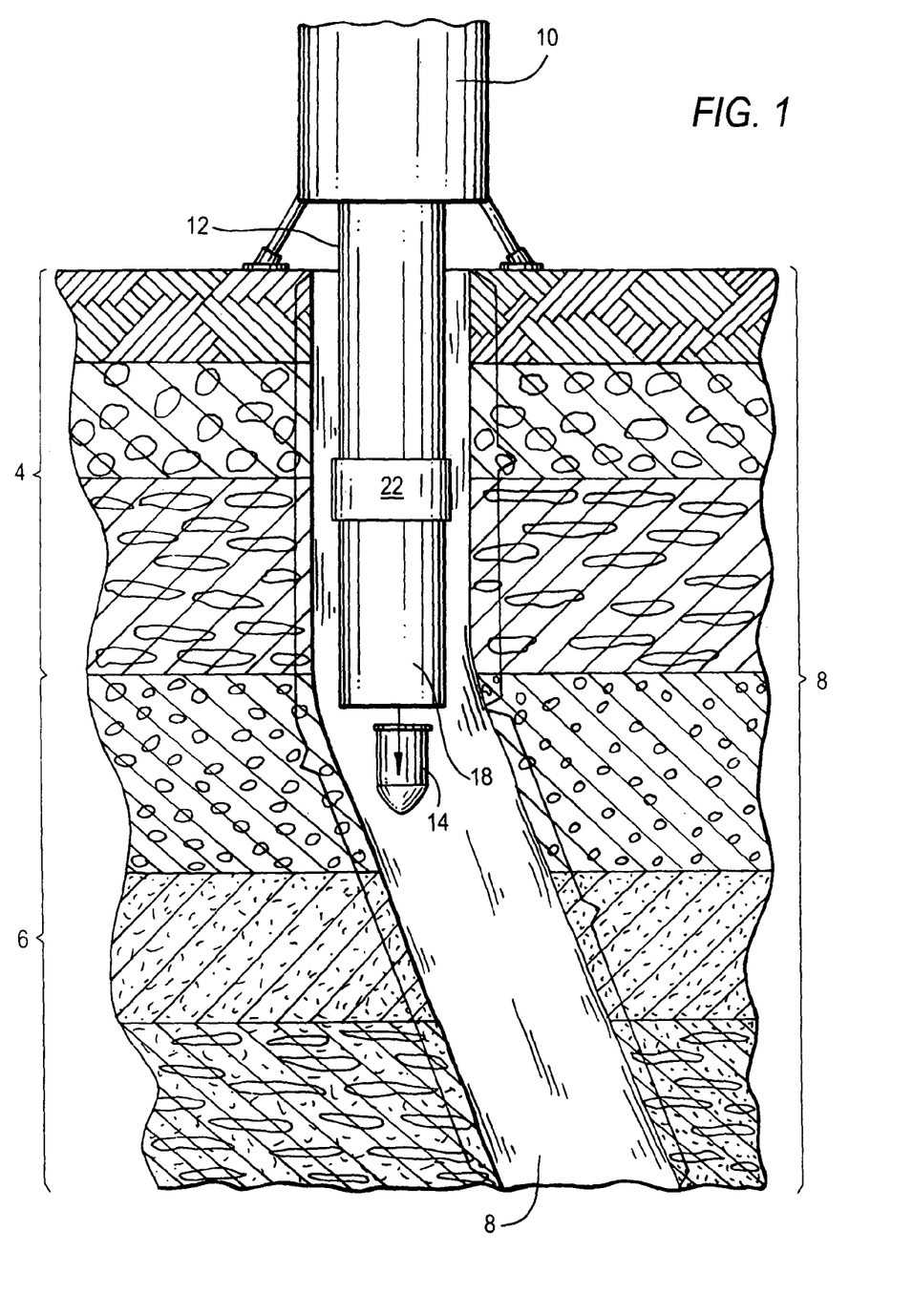
FIG. 1 illustrates layers of unconsolidated geological formations with a bore hole comprising a vertical portion and a non-line-of-sight.

The present invention provides a seismic gun assembly for delivering a projectile through a non-line-of-sight bore hole for surveying geologic formations. The seismic gun assembly comprises an improved projectile used in conjunction with a guide tube for geophysical exploration. The seismic gun assembly further provides a noise suppressor, a fluid exclusion puck, a recoil and return modulating mechanism of the seismic gun and alternative versions of the guide tube.
Seismic Gun A preferred embodiment of a seismic gun assembly of the present invention will now be described. FIG. 1 illustrates a cross sectional view of a plurality of layers representing unconsolidated geologic formations 2 and bore hole 8. Bore hole 8 is divided into multiple sections, including vertical section 4 and non-line-of-sight section 6. Non-line-of-sight section 6 of bore hole 8 illustrated in FIG. 1 is formed when a drill rig contacts dense geologic formations, such as rocks, boulders, etc. As a result of the drill contacting dense formations, the drill will diverge from its linear course to produce a helix shaped hole. There may therefore be multiple non-line-of-sight sections, the first of which is depicted as 6. The ratio of the radius of the helix to the radius of the hole is often such that no line of sight exists from top to bottom. This occurrence is referred to as a non-line-of-sight bore hole. Non-line-of-sight bore holes can be either curved or slanted. A slanted bore hole contains at least one sharp angled deviation from a straight line course, where a curved bore hole does not contain a clear line-of-sight from top to bottom, but lacks any sharp deviations in trajectory. The seismic gun assembly of the present invention is suitable for both curved and slanted bore holes, such as the one shown in FIG. 9.

Figure 2:
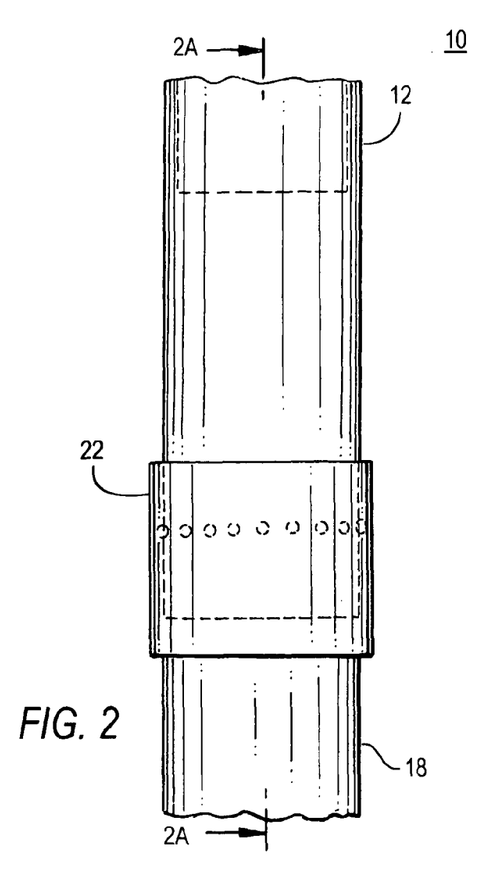
FIG. 2 illustrates an assembly of a seismic gun barrel and a guide tube.

Referring to FIGS. 1 and 2, seismic gun barrel 12 and guide tube 18 are coupled to one another so that a projectile may pass through the coupling. The combination of barrel 12 and guide tube 18 is then lowered into bore hole 8 with non-line-of-sight section 6. When barrel 12 and guide tube 18 are properly positioned within bore hole 8, projectile 14 is introduced in barrel 12. Next, seismic gun 10 is engaged for firing projectile 14 into bore hole 8 with non-line-of-sight section 6. Projectile 14 can be fired into bore hole 8 by a number of energy transfer mechanisms. Such energy transfer mechanisms include, but are not limited to, chemical propellants, compressed gas, multi stage gun or electromagnetic energy transfer guns.

Figures 4, 5:
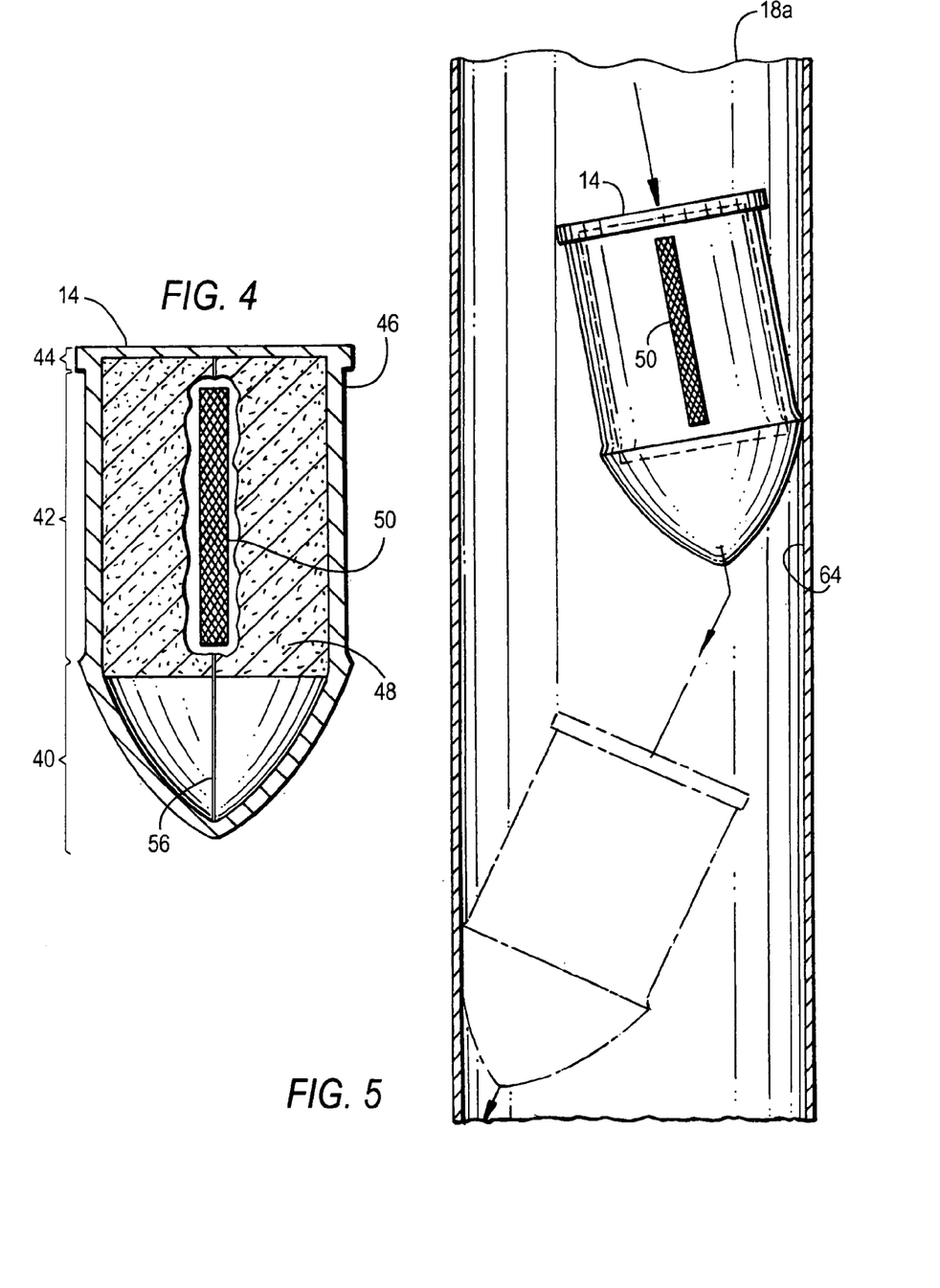
FIG. 4 illustrates a projectile scored longitudinally with a tubular jacket and a core filled with frangible material.
FIG. 5 illustrates a large diameter guide tube with a projectile performing shallow angle bouncing.
Figure 8:
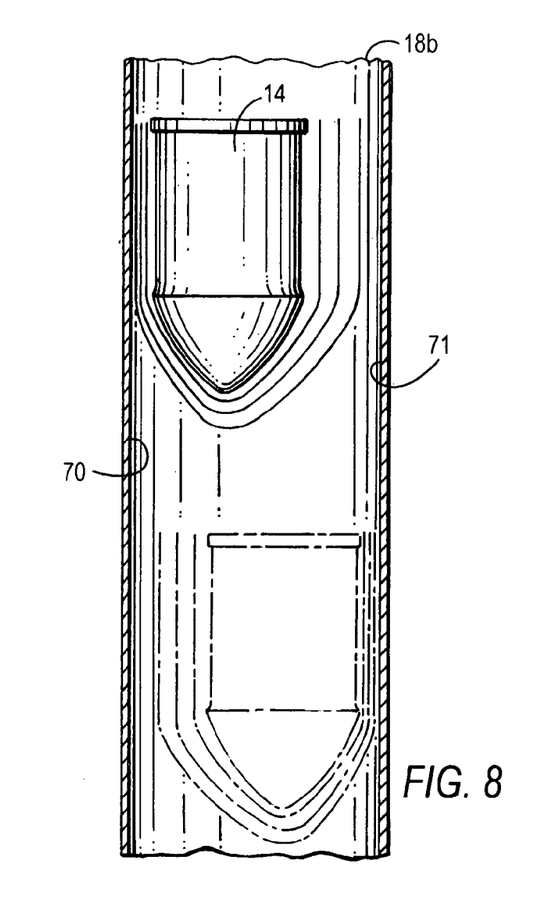
FIG. 8 illustrates a tight fitted guide tube with a projectile traveling by pressure cushion bouncing.

There are two modes for effectively delivering projectile 14 to the bottom of bore hole 8 with non-line-of-sight section 6—large diameter guide tube 18a or tight fitted guide tube 18b, shown in FIGS. 5 and 8 respectively. The size of the diameter of the guide tube is relative to the diameter of the projectile. Guide tubes having a diameter 1.5 or more times the diameter of the projectile are considered wide. Guide tubes having a diameter 1.1 or less times the diameter of the projectile are considered tight. Intermediate values will exhibit characteristics of both cases. If large diameter guide tube 18a is used, projectile 14 is able to ride inner wall 64 of large diameter guide tube 18 or perform guide tube bouncing as shown in FIG. 5. If tight fitted guide tube 18b is used, projectile 14 rides inner wall 70 of tight fitted guide tube 68 to reach the bottom of bore hole 8 with non-line-of-sight section 6, as shown in FIG. 8.

Figure 2A:
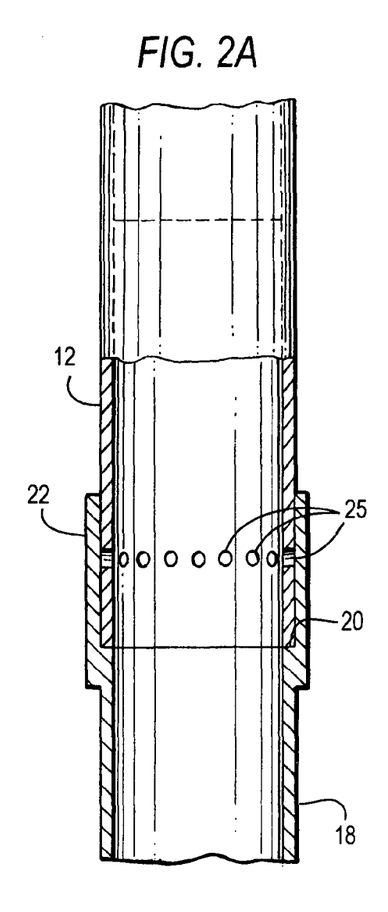
FIG. 2A is a sectional view of the seismic gun barrel and a guide tube.
Figure 2B:
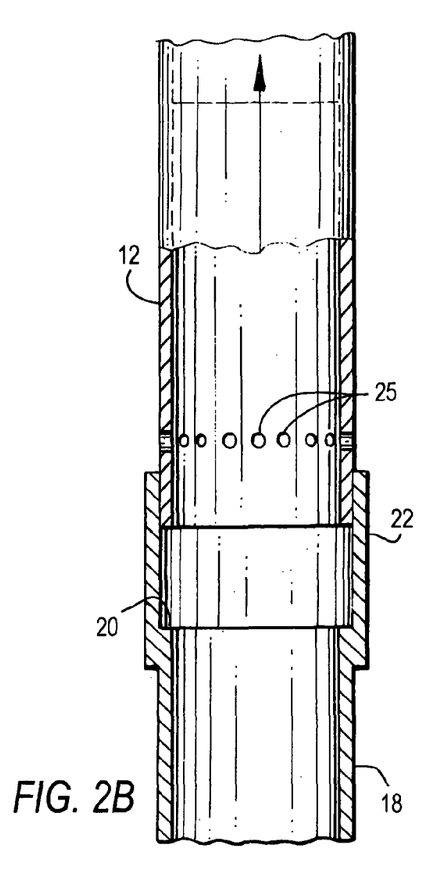
FIG. 2B is a sectional view of the seismic gun barrel and a guide tube in the recoil position.

Projectile 14 is loaded into and fired from barrel 12. FIGS. 2, 2A and 2B illustrate various methods of securely coupling barrel 12 to Guide tube 18. Guide tube 18 is preferably cylindrical, extends into bore hole 8 and includes upper guide tube wall 22 and edge 20. Edge 20 is shown as flat, but can also be formed in a cone shape. As shown in FIG. 2, upper guide tube wall 22 is wider in diameter than the rest of guide tube 18. Barrel 12 includes vent holes 25 and in its normal position, rests on edge 20. As will be discussed below, when seismic gun 10 fires, barrel 12 is forced upward into a recoil position shown in FIG. 2B. During recoil, vent holes 25 extend above upper guide tube wall 22.

After being fired, seismic gun 10 will recoil due to the momentum transferred to projectile 14. As seismic gun 10 recoils, barrel 12 will slide vertically so that holes 25 will extend above upper guide tube wall 22. Once vent holes 25 are no longer covered by upper guide tube wall 22, the barrel can effectively vent.

Figure 3:
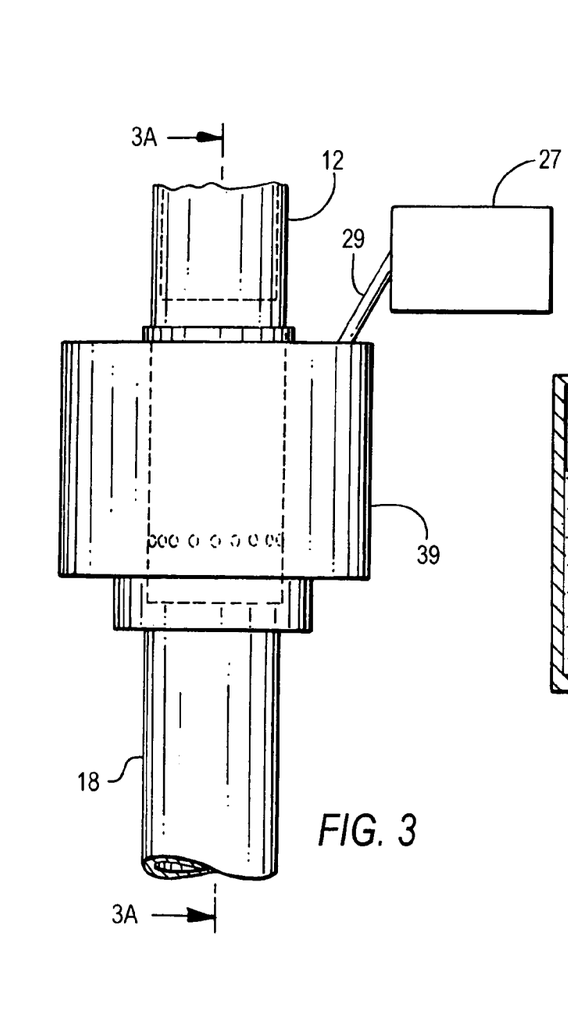
FIG. 3 illustrates the seismic gun barrel and a guide tube with a noise suppression collar.
Figure 3A:
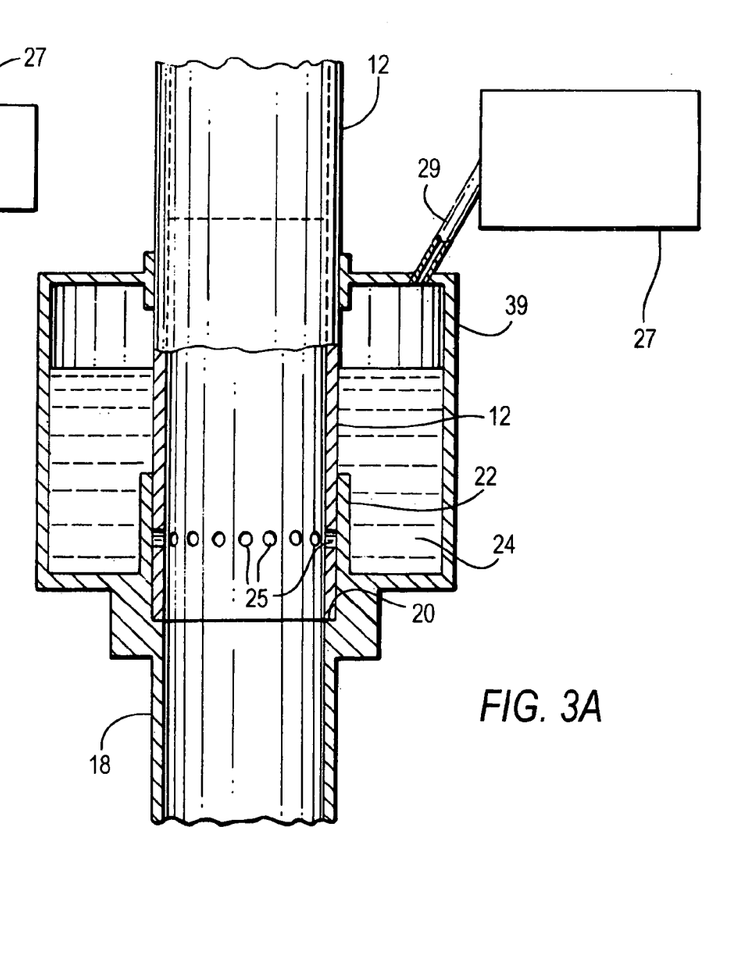
FIG. 3A is a sectional view of the seismic gun barrel and a guide tube with a noise suppression collar.
Figure 3B:
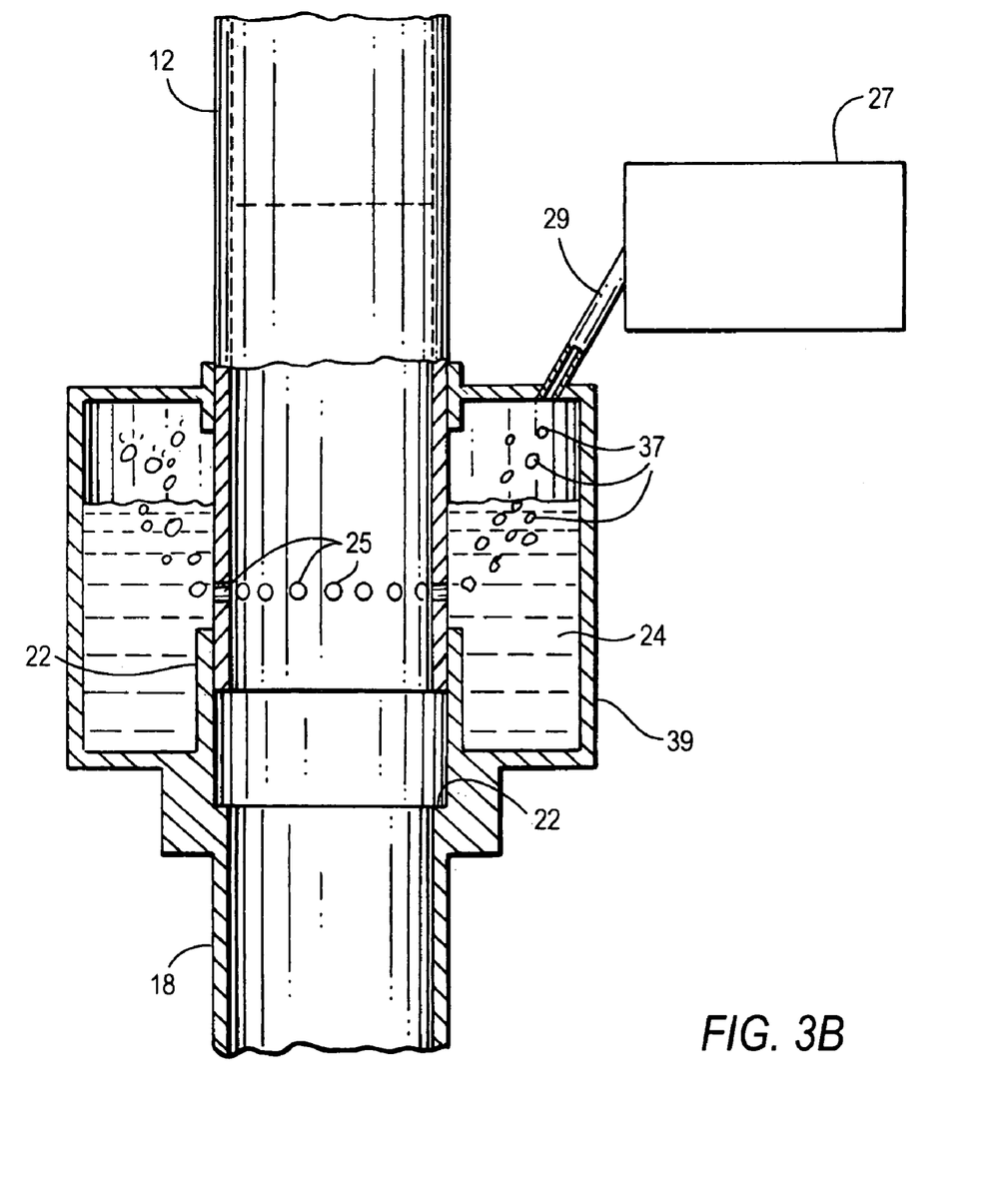
FIG. 3B is a sectional view of the seismic gun barrel and a guide tube with a noise suppression collar in the recoil position.

Another preferred embodiment is illustrated in FIGS. 3 and 3A. FIGS. 3 and 3A show seismic gun 10 of FIGS. 2, 2A and 2B further including suppression collar 39. Suppression collar 39 wraps around the connection of barrel 12 and guide tube 18. As can be seen in FIG. 3B, after seismic gun 10 is fired, barrel 12 rises to a recoil position. In the recoil position, vent holes 25 extend above upper guide tube wall 22. This allows pressure and muzzle gas 37 (see FIG. 3B) from the firing of seismic gun 10 to pass into suppression collar 39. By preventing pressure and muzzle gas 37 from being expelled directly into the surrounding air, both physical pollution and noise pollution are limited.

There are several options to control muzzle gas 37 once released into suppressing collar 39. As illustrated in FIG. 3B, suppressing collar 39 can be filled with water in water reservoir 24. As vents 25 become exposed, muzzle gas 37 must pass through water reservoir 24, thereby cooling muzzle gas 24. Suppressing collar 39 is further connected to vacuum container 27 by vacuum container connection 29. Vacuum container 27 prevents pressure build-up in suppressing collar 30 by extracting muzzle gas 37 in a cooled or uncooled state.
Projectile As illustrated in FIG. 4, projectile 14 consists of projectile nose 40, projectile core 42 and projectile base 44. The exterior of projectile 14 is tubular jacket 46. Jacket 46 is constructed preferably of steel or another material strong enough to maintain the integrity of jacket 46 when fired and during travel. The interior of projectile 14 is frangible material 48. Frangible material 48 is preferably a mixture of steel granules and an epoxy binder—though, aluminum, copper and iron are also effective in place of steel. Different granules should be used depending on the density, bulk modulus, strength and other mechanical properties of the geologic formation being fired at. Frangible material 48 is beneficial because it limits the penetration of projectile 14, thus transferring momentum directly to the ground in a shorter amount of time.

Two other optional characteristics of projectile 14 are longitudinal scoring 50 (see FIG. 4) and energetic material 56 placed along the axis of the frangible projectile that is initiated upon impact to disrupt the frangible projectile. Longitudinal scoring 50 promotes disruption of projectile 14 upon impact with a geologic formation. The amount and depth of scoring 50 will regulate the rapidity with which projectile jacket 46 is disrupted.

Figure 6:
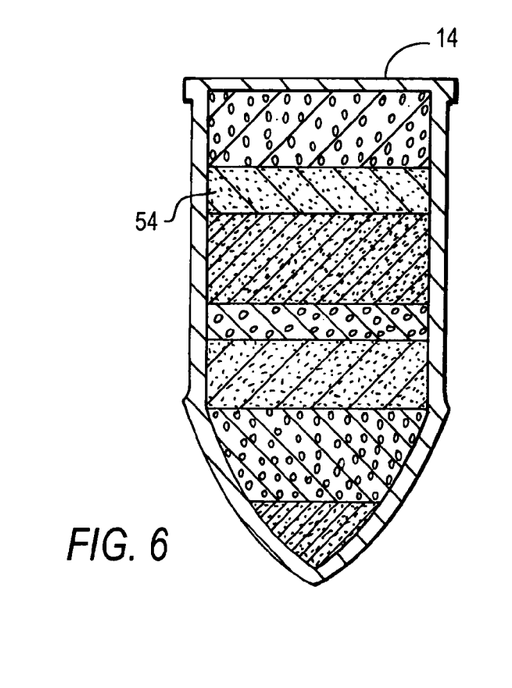
FIG. 6 illustrates a non-homogeneous projectile with a tubular jacket and frangible material arranged along the length of the projectile.

Referring to FIG. 6, another embodiment of the present invention is non-homogeneous projectile 52. Non-homogeneous projectile 52 includes arranged frangible material 54. Arranged frangible material 54 is arranged to create varying strength and density through the length of projectile 52. When non-homogeneous projectile 52 impacts a geological formation, the shape of the induced pressure pulse in the geological formation, correlates to the design of arranged frangible material 54. Since every individually designed non-homogeneous projectile 52 will provide a unique energy transfer curve when detected by ground sensors, individualized energy transfer curves allow data from multiple seismic guns operating near one another to be isolated and analyzed separately.

Referring to FIG. 5 and to the embodiment of large diameter guide tube 18a, projectile 14 is given sufficient spacing between itself and inner wall 64 of large diameter guide tube 18a to allow shallow angle bouncing. FIG. 5 is meant to be illustrative and does not necessarily reflect the appropriate size relationship between projectile 14 and large diameter guide tube 18a. Shallow angle bouncing occurs where projectile 14 approaches inner wall 64 at a very small angle and is deflected away without incurring any significant loss of momentum. Shallow angle bouncing between projectile 14 and inner wall 64 allows the projectile 14 to reach the bottom of bore hole 8 with non-line-of-sight section 6. Although projectile 14 is traveling at a high velocity due to the shallow angle, the contact between projectile 14 and inner wall 64 will not damage large diameter guide tube 18a or projectile 14.

Additionally a solid bar projectile can be used. The solid bar projectile has a hollow tip and includes one or more cuts from its tip towards the base. It may have a hollow or foam filled cavity along the vertical axis. The solid bar projectile will act like a hollow point bullet in that its radial surface area will increase upon impact. This effect will increase the rate of momentum transfer from the projectile to the ground without increasing the drag of the projectile. If material is present in the cavity, it may be forced into the hollow tip during impact.

Figure 7:
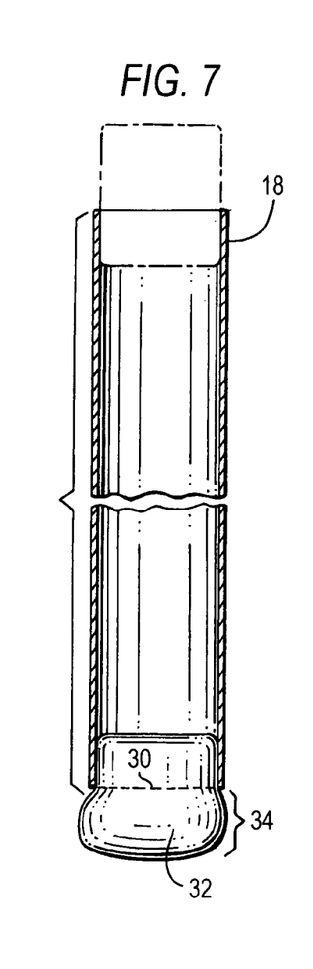
FIG. 7 illustrates a guide tube with a fluid exclusion puck.

FIG. 7 provides a full profile section of guide tube 18 with fluid exclusion puck 32. Fluid exclusion puck 32 is made of a compressible but solid material. It is inserted in the top end of guide tube 18 and forced towards bottom 30 of guide tube 18. At bottom 30, fluid exclusion puck 32 is positioned partially below bottom 30 and partially inside of guide tube 18. As shown in FIG. 7, lower portion 34 of puck 32 expands in diameter once below bottom 30.

Figure 9:
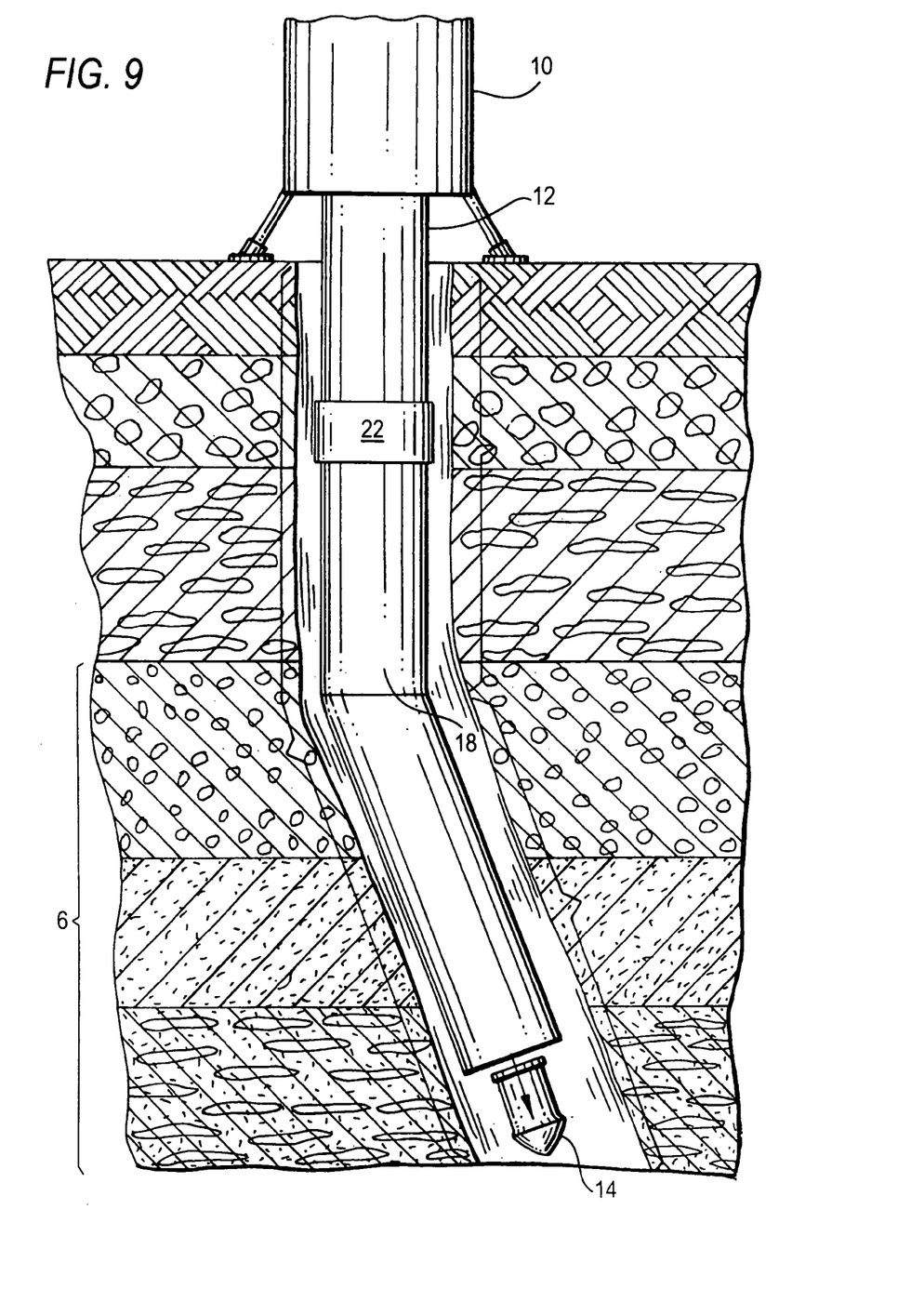
FIG. 9 illustrates a barrel and guide tube assembly reaching towards the bottom of a non-linear portion of a bore hole.

FIG. 8 illustrates the use of tight fitted guide tube 18b. Tight fitted guide tube 18b includes inner wall 70 and is shown with projectile 14. FIG. 8 is illustrative and not meant to show the precise size relationship between tight fitted guide tube 18b and projectile 14. Tight fitted guide tube 18b may traverse through both vertical section 4 and non-line-of-sight section 6, as shown in FIG. 9. Projectile 14 passes through the non-line-of-sight section as it travels from the seismic gun 10 to the bottom of bore hole 8. As projectile 14 travels and encounters a bend in tight fitted guide tube 18b, projectile 14 will move closer to inner wall 70. FIG. 8 shows projectile 14 in this position. Also shown are pressure lines indicating an increase in pressure as projectile 14 moves closer to inner wall 70. The pressure between projectile 14 and inner wall 70 increases as the distance between them decreases. This force will move projectile 14 away from inner wall 70 and towards opposite inner wall 71. Once projectile 14 is sufficiently near to opposite inner wall 71, the pressure between opposite inner wall 71 and projectile 14 forces projectile 14 back towards the center.

Optionally, a pliable gas seal (not shown) can be attached to the projectile at the base or apex. The pliable gas seal traps the propellant gas and will prove a beneficial method of guiding the projectile when the force exerted by the pressure of the propellant gas exceeds the force caused by friction between the pliable gas seal and the guide tube.

Further to the above embodiments, the present invention includes two systems for mitigating recoil of seismic gun 10. Due to the immense force used to deliver projectile 14 or non-homogeneous projectile 52 down bore hole 8 for obtaining the desired seismic waves, seismic gun 10 may perform a kickback or recoil motion. During the recoil motion, seismic gun 10 is launched into the air and then returns to the ground. Due to the removal of the weight of the gun during its upward motion, a release wave is induced into the ground. The return to the ground creates an impact which could interfere with the ground sensor data.

The first recoil mitigation system is a mass ejection system. The mass ejection system ejects a mass in the direction opposite the velocity of the projectile, typically vertically upward. The ejection occurs simultaneously with the projectile firing and the mass has momentum substantially equal to that of the projectile. Therefore the two momenta substantially cancel and seismic gun 10 remains substantially at rest.

The second recoil mitigation system is a braking system. The braking system dampens the acceleration of seismic gun 10 on its return to the ground after being lifted into the air. The system employs a drag force, which dampens the force exerted on the ground as seismic gun 10 returns. The drag force can be due to a parachute, hydraulic damper, a spring, an eddy current or a viscous fluid, etc.

Figure 10:
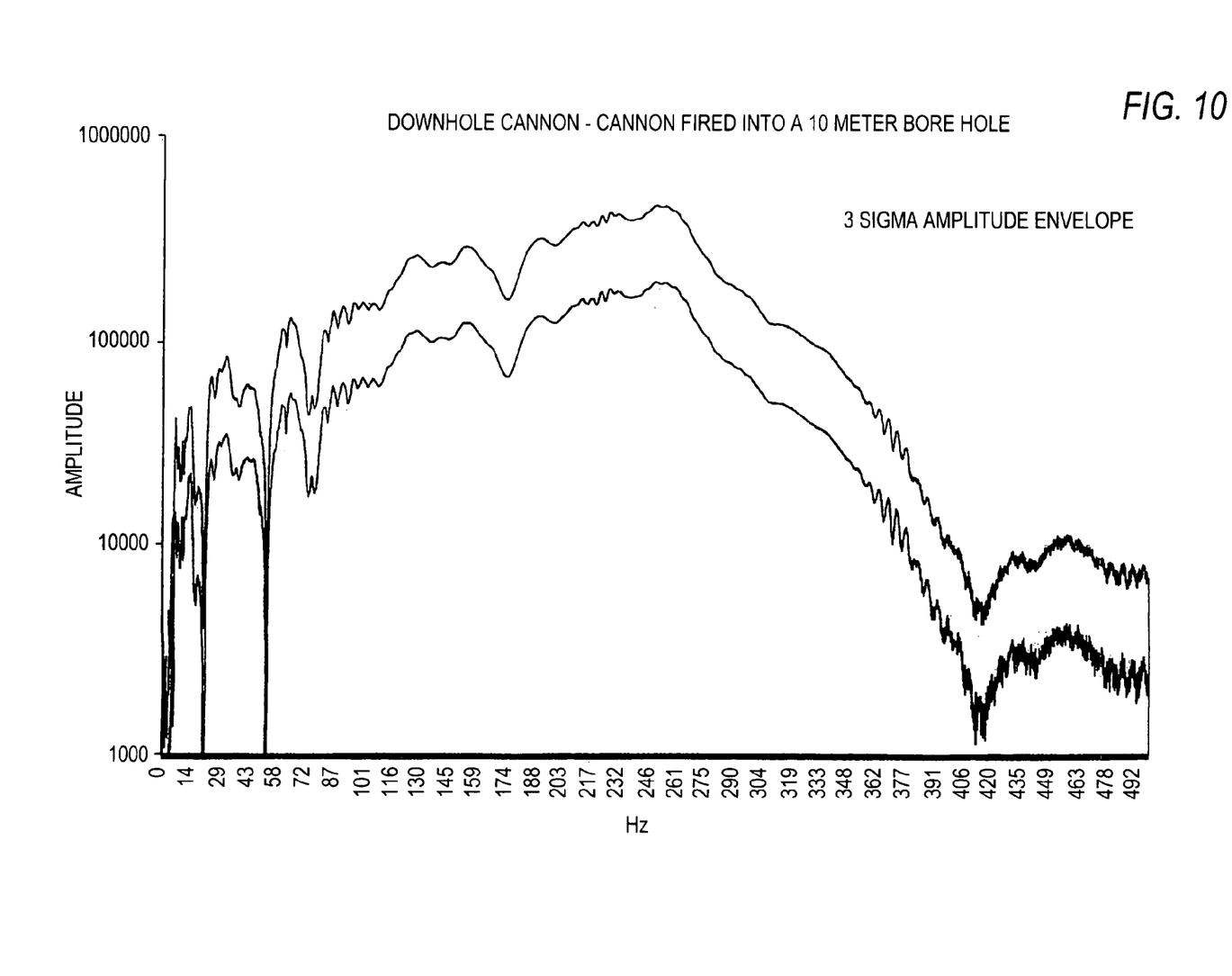
FIG. 10 is a graph showing the frequency distribution response of a projectile fired by the present invention into a 10 meter bore hole.
Figure 11:
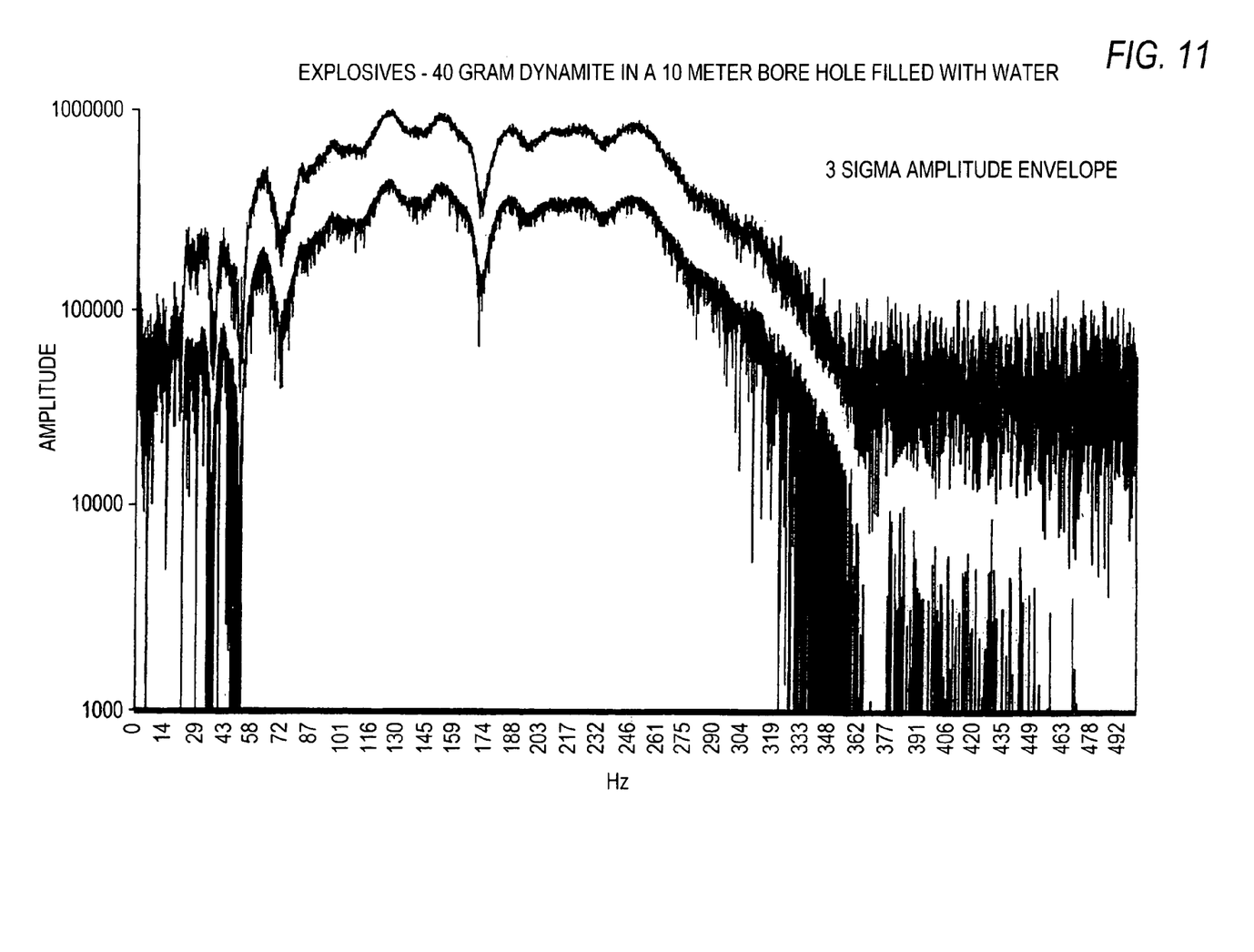
FIG. 11 is a graph showing the frequency distribution response of a 40 gram dynamite explosive in a 10 meter bore hole filled with water.
Figure 12:
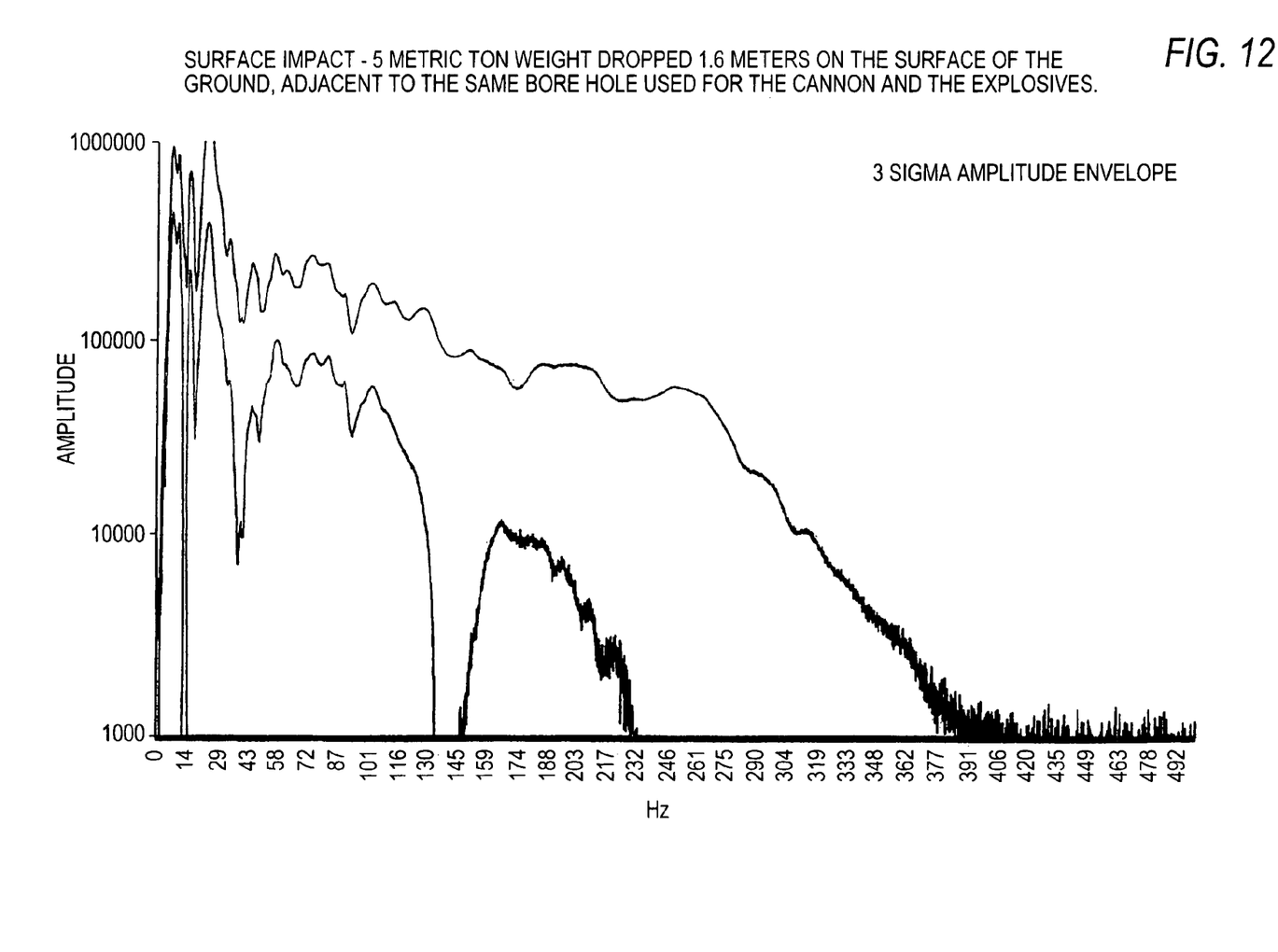
FIG. 12 is a graph showing the frequency distribution response of a 5 metric ton weight being dropped 1.6 meters above the ground.

FIGS. 10-12 show seismic wave frequency distribution measured by sensors buried in 10 meter bore holes at a distance from the impact of approximately 50 meters. The graphs have been modified to use shading to show the upper and lower bounds of the results. FIG. 10 shows a frequency distribution for a projectile being fired into a 10 meter deep bore hole. FIG. 11 shows a frequency distribution for a 40 gram dynamite explosive in a 10 meter bore hole filled with water. FIG. 12 shows a frequency distribution from a 5 metric ton weight being dropped 1.6 meter from the surface of the ground.

In comparing the three graphs, one can see the improved clarity and lessened extraneous data found in FIG. 10.

Although the invention has been described with the above preferred embodiment, it will be apparent to those of ordinary skill in the art that modifications and improvements can be made to the invention herein without departing from the scope of the invention. The embodiments shown herein are merely for illustrative of the inventive concepts and should not be construed as limiting the scope of the invention.

I claim:

1. A seismic gun assembly for surveying underground geological topology, the seismic gun assembly comprising: a mobile seismic gun body; a barrel including a breach end and a muzzle end, said breach end in connection with the mobile seismic gun body for receiving a projectile into said barrel and said muzzle end directing the projectile towards the bottom of a bore hole; and a guide tube having an upper end and a terminal end, said upper end aligned with the muzzle end of the barrel, and said guide tube having walls to direct the projectile towards the bottom of the bore hole, when positioned inside a non-line-of-sight bore hole, wherein said guide tube is a tight fitted guide tube that does not allow substantial radial movement when the projectile is traveling through the tight fitted guide tube.

2. The seismic gun assembly of claim 1, wherein the guide tube is a large diameter guide tube, with an inner circumference that is spaced apart from the projectile to allow shallow angle bouncing when the projectile is traveling through the large diameter guide tube.

3. The seismic gun assembly of claim 1, wherein the connection between the muzzle end and the guide tube is enclosed by a suppressing collar.

4. The seismic gun assembly of claim 3, wherein the mobile seismic gun body includes a breaking system for modulating recoil once a projectile is launched into the bore hole, the breaking system stopping the mobile seismic gun body slightly after a recoiling apex of the mobile seismic gun body.

5. The seismic gun assembly of claim 1, wherein the mobile seismic gun body includes a mass ejected in an opposite direction of the projectile for canceling recoil momentum of the projectile.

6. A seismic gun assembly for surveying underground geological topology, the seismic gun assembly comprising: a mobile seismic gun body; a barrel including a breach end and a muzzle end, said breach end in connection with the mobile seismic gun body for receiving a projectile into said barrel and said muzzle end directing the projectile towards the bottom of a bore hole; and a guide tube having an upper end and a terminal end, said upper end aligned with the muzzle end of the barrel, and said guide tube having walls to direct the projectile towards the bottom of the bore hole, when positioned inside a non-line-of-sight bore hole, wherein the muzzle end of the barrel includes a male cone and a first tubular extension and the upper end of the guide tube is fitted with a female cone and a suppressing collar.

7. The seismic gun assembly of claim 6, wherein a vacuum reservoir is coupled to the suppressing collar.

8. A seismic gun assembly for surveying underground geological topology, the seismic gun assembly comprising: a mobile seismic gun body; a barrel including a breach end and a muzzle end, said breach end in connection with the mobile seismic gun body for receiving a projectile into said barrel and said muzzle end directing the projectile towards the bottom of a bore hole; a guide tube having an upper end and a terminal end, said upper end aligned with the muzzle end of the barrel, and said guide tube having walls to direct the projectile towards the bottom of the bore hole, when positioned inside a non-line-of-sight bore hole, and a fluid exclusion puck.

9. The seismic gun assembly of claim 8, wherein the fluid exclusion puck is disposed at the terminal end of the guide tube, in which one portion of the fluid exclusion puck resides within the terminal end of the guide tube and a second expandable portion of the fluid exclusion puck protrudes from the terminal end of the guide tube creating a fluid exclusion seal.

10. A seismic gun assembly for surveying underground geological topology, the seismic gun assembly comprising: a mobile seismic gun body; a barrel including a breach end and a muzzle end, said breach end in connection with the mobile seismic gun body for receiving a projectile into said barrel and said muzzle end directing the projectile towards the bottom of a bore hole; and a guide tube having an upper end and a terminal end, said upper end aligned with the muzzle end of the barrel, and said guide tube having walls to direct the projectile towards the bottom of the bore hole, when positioned inside a non-line-of-sight bore hole, wherein the projectile comprises an outer tubular jacket and a frangible material in its interior and wherein the tubular jacket is scored longitudinally to regulate tubular jacket disruption.

11. The seismic gun assembly of claim 10, wherein the outer tubular jacket is strengthened at its nose for protecting the projectile during acceleration and travel.

12. The seismic gun assembly of claim 10, wherein the projectile core is filled with frangible material, the frangible material includes at least one of steel granules, copper granules, iron granules, aluminum granules, tungsten granules, tungsten steel granules, tungsten carbide granules or a combination thereof.

13. The seismic gun assembly of claim 12, wherein the frangible material is arranged non-homogeneously to produce varying strength and density zones.

14. A seismic gun assembly for surveying underground geological topology, the seismic gun assembly comprising: a mobile seismic gun, configured to fire a projectile into a non-line-of-sight bore hole; a barrel attached to the mobile seismic gun; a guide tube selectively attached to the barrel and extending into the non-line-of-sight bore hole; a noise suppression collar surrounding the selective attachment of the barrel and the guide tube, the noise suppression collar receiving muzzle gas from the barrel, and vent holes which transition from a closed state to an open state upon the firing of the seismic gun.

15. The seismic gun assembly of claim 14, wherein the noise suppression collar includes a heat absorbing liquid and an exhaust vent.

16. A seismic gun projectile for transferring momentum to a bore hole as part of a system for surveying underground topology, the projectile comprising: a hollow tip for leading the projectile towards the bottom of the bore hole and expanding radially upon impact; a body attached to the tip and containing a frangible material for spreading upon the impact site of the bore hole.

17. The seismic gun projectile of claim 16, wherein the frangible material comprises a plurality of layers of granules, each adjacent layer having granules of differing characteristics.

18. The seismic gun projectile of claim 16, where the frangible material is granules of steel.

* * * * *